March 18, 1941.  W. RATH  2,235,489
CERAMIC ELECTRIC INSULATING BODY
Filed Dec. 24, 1937
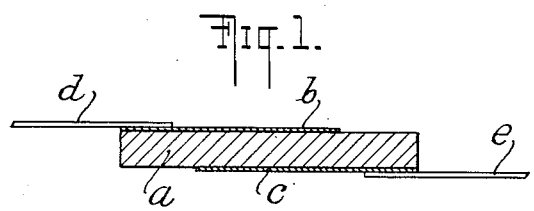
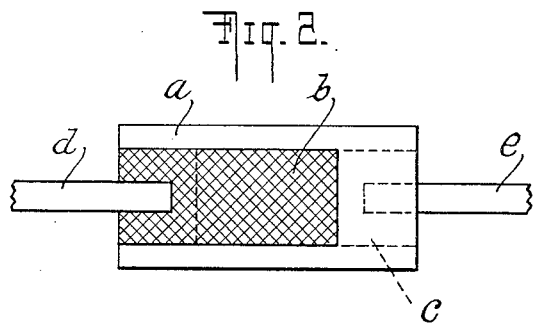
WITNESS
INVENTOR
WERNER RATH
BY
ATTORNEYS Patented Mar. 18, 1941

2,235,489

UNITED STATES PATENT OFFICE 2,235,489

CERAMIC ELECTRIC INSULATING BODY

Werner Rath, Bad Klosterlausnitz, Germany

Application December 24, 1937, Serial No. 181,586
In Germany September 28, 1936

8 Claims. (Cl. 106—12)

The invention relates to sintered ceramic electric insulating bodies of high dielectric constant, more particularly for condensers with a ceramic dielectric of the kind mentioned or for other articles containing said insulating bodies. The invention relates further to a process for making said condensers and other articles (like spools, wiring elements of any kind having a ceramic body supporting the conducting parts) and the insulating bodies therefor. Such insulating bodies contain more or less large proportions of titanium dioxide; for example insulating materials with a dielectric constant $\epsilon$ of from 40-90 have a titanium dioxide content of 70-100 per cent with the addition of suitable quantities of plastifying agents such as china clay, soapstone and other alkali-free additives in the form of alkaline earth oxides.

In order that insulating bodies made from these constituents should be of some utility, it is important that the dielectric losses should be small. This is for example the case at high frequency in the above mentioned known materials containing titanium, but the angle of loss increases very rapidly with decreasing frequency so that even at moderate frequencies it has a relatively high value. The object of the invention is to provide ceramic insulating bodies of high dielectric constant which have small dielectric losses in all frequency ranges, or, in other words, to ensure the independency of the dielectric losses from changes of the frequency.

According to the invention, this is attained in a particularly advantageous manner by adding, in the process of producing insulating bodies from materials containing at least 70 per cent of titanium dioxide, compounds of metals belonging to group VIA of the periodic system of the elements and having an atomic weight between 96 and 184 inclusive. More particularly use may be made of tungsten and molybdenum compounds in the form of tungstic anhydride and/or molybdic anhydride. With the same result other compounds of said metals may be employed—provided that these compounds are converted into oxides during the ceramic burning process. For this purpose there may serve for instance other oxides of said metals than the above mentioned anhydrides, further all salts, as nitrates or sulfates, which form oxides during burning. The ingredients of the ceramic mass are—in the presence of suitable plastifying and binding means, such as known liquids usually employed for these purposes in the ceramic art—mixed, moulded, shaped and burnt at suitable sintering temperature, in any suitable manner known to those skilled in the art.

When adding tungsten compounds for example, even small additions (preferably within the range of 0.2 to 6 per cent) are sufficient to lower the angle of loss at low frequencies (e. g. 800 cycles) to extremely low values of $tg\delta$, e. g. 2 to 5 x $10^{-4}$. Such small additions to the titanium dioxide have no detrimental effect on the high dielectric constant.

For example, the dielectric constant $\epsilon$ of materials of the above kind containing titanium dioxide is 70 to 82 when there has been an addition of 2 per cent of the said compounds, more particularly tungsten compounds. This signifies a remarkable advance, as hitherto the maximum value of the dielectric constant $\epsilon$ of materials containing titanium dioxide and having a low angle of loss at low frequencies was 55. The invention, however, makes it possible to keep a very high content of titanium dioxide in the materials if desired, because the additions necessary for reducing the angle of loss at low frequencies may be kept small. In this way it is possible to produce insulating bodies and condensers, which, with very small dimensions, have a very high capacity and at the same time a very small dielectric angle of loss both at high frequency as well as at low frequency.

In ceramic bodies containing titanium dioxide to an extent resulting in a somewhat lower dielectric constant, e. g. in the order of $\epsilon=40$, the effect of adding compounds of said metals is no more so pronounced, but still considerable. For instance, relatively low dielectric losses of about $tg\delta=15\times10^{-4}$ may be achieved in bodies of the last mentioned kind.

Suitable mixtures for making ceramic bodies having a relatively high dielectric constant and relatively low dielectric losses in all frequency ranges consist for example of (1) | | Per cent |
|---|---|
| Titanium dioxide | 75 |
| Magnesite | 13 |
| Alkali-free china clay | 10 |
| Tungstic anhydride | 2 |

$\epsilon=40$
$tg\delta=15\times10^{-4}$ (2) | | Per cent |
|---|---|
| Titanium dioxide | 90 |
| Alkali-free china clay | 9 |
| Tungstic anhydride | 1 |

$\epsilon=60$
$tg\delta=3$ to $5\times10^{-4}$ (3) | | Per cent |
|---|---|
| Titanium dioxide | 99.5 |
| Tungstic anhydride | 0.5 |

$\epsilon=90$
$tg\delta=2$ to $4\times10^{-4}$ (4) | | Per cent |
|---|---|
| Titanium dioxide | 98 |
| Ammonium molybdate | 2 |

$\epsilon=82$
$tg\delta=4$ to $8\times10^{-4}$

The ceramic mixtures into which the titanium dioxide may be introduced in the form of the mineral rutil are moulded, shaped and burnt in known manner at sintering temperature, i. e. about Seger cone 13 to 14. Care is to be taken that, for achieving the optimum values of $\epsilon$ and $tg\delta$, the burning conditions, as temperature and duration, are determined by simple experiments, as usual in the ceramic art. In the present case, it is necessary, for instance, that the articles, after burning and while cooling, are subjected to the influence of air at temperatures of above 1000° C. Obviously the measures to be taken depend also on the kind of furnace used, all this being known to those skilled in the art.

Figs. 1 and 2 are sectional and plan views respectively of a condenser with the improved dielectric.

For making a condenser of high capacity and low dielectric losses, having a ceramic dielectric according to the invention, the ceramic body is prepared along known ceramic methods, and is provided, after burning, with suitable condenser plates, for instance by coating the body $a$ with layers $b$ and $c$ of noble metals, as silver or gold, in the same manner as ornamental designs are provided on ceramic bodies by the so called "burning on" process. For a more detailed disclosure of this process reference may be had to the British Patent No. 432,793. Said layers may be reenforced, if desired, in any suitable way for connecting the condenser plates with the conductors $d$ and $e$.

What I claim is:

1. An electric insulating body of sintered ceramic material having a high dielectric constant, and containing at least 70 per cent of titanium dioxide and an oxide of a heavy metal belonging to group VIA of the periodic system of the elements and having an atomic weight between 96 and 184 inclusive.

2. A condenser dielectric of sintered ceramic material containing at least 70 per cent of titanium dioxide and alkali-free ceramic filling materials comprising sintering and plastifying agents and about 2 per cent of tungstic anhydride.

3. An electric insulating article of sintered ceramic material consisting of 75 per cent titanium dioxide, 13 per cent magnesite, 10 per cent alkali-free china clay and 2 per cent tungstic anhydride.

4. An electric insulating article of sintered ceramic material consisting of 90 per cent titanium dioxide, 9 per cent alkali-free china clay and 1 per cent tungstic anhydride.

5. An electric insulating article of sintered ceramic material consisting of 99.5 per cent titanium dioxide and 0.5 per cent tungstic anhydride.

6. An electric insulating article of sintered ceramic material produced by sintering a mixture consisting of 98 per cent titanium dioxide and 2 per cent ammonium molybdate.

7. A condenser dielectric of sintered ceramic material containing at least 70% of titanium dioxide and alkali-free ceramic filling materials comprising sintering and plastifying agents and about 2% of molybdic anhydride.

8. An electric insulating body of sintered ceramic material having a high dielectric constant and containing at least 70% of titanium dioxide and an oxide of the group consisting of tungsten and molybdenum.

WERNER RATH.